United States Patent
Alsharif (10) Patent No.: US 12,542,791 B2
(45) Date of Patent: Feb. 3, 2026

(54) METHOD AND SYSTEM FOR DETECTING UNAUTHORIZED CHANGES AND ACTIVITIES IN A CORPORATE NETWORK USING STEGANOGRAPHY

(71) Applicant: Saudi Arabian Oil Company, Dhahran (SA)

(72) Inventor: Sultan Saadaldean Alsharif, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 176 days.

(21) Appl. No.: 18/240,129

(22) Filed: Aug. 30, 2023

(65) Prior Publication Data
US 2025/0080548 A1 Mar. 6, 2025

(51) Int. Cl.
*H04L 9/00* (2022.01)
*H04L 9/40* (2022.01)

(52) U.S. Cl.
CPC ...... *H04L 63/1416* (2013.01); *H04L 63/0414* (2013.01); *H04L 63/0435* (2013.01); *H04L 63/20* (2013.01)

(58) Field of Classification Search
CPC ............. H04L 63/1416; H04L 63/0414; H04L 63/0435; H04L 63/20; H04L 63/0428
See application file for complete search history.

(56) References Cited

U.S. PATENT DOCUMENTS

| | | | |
|---|---|---|---|
| 5,613,004 | A | 3/1997 | Cooperman et al. |
| 2002/0010684 | A1 | 1/2002 | Moskowitz |
| 2005/0039040 | A1 | 2/2005 | Ransom et al. |
| 2020/0184592 | A1 | 6/2020 | Baluja |
| 2020/0293658 | A1* | 9/2020 | Krishna Murthy ... G06F 21/572 |
| 2020/0301036 | A1 | 9/2020 | Ramfjord et al. |
| 2022/0261944 | A1 | 8/2022 | Wengrowski et al. |
| 2024/0127238 | A1* | 4/2024 | Day ................... G06Q 20/3827 |

OTHER PUBLICATIONS

The Ancient Practice of Steganography, Author James Stanger—Published Jul. 6, 2020 (Year: 2020).*

(Continued)

*Primary Examiner* — Syed M Ahsan
(74) *Attorney, Agent, or Firm* — Fish & Richardson P.C.

(57) ABSTRACT

A computer-implemented method includes: continuously generating, by a server on an enterprise network, an instance of a secret message encrypting information specific to a target system on the enterprise network; embedding, using steganography, the instance of the secret message on the target system, wherein the embedding is conducted when the instance of the secret message is generated; maintaining, by the server, a database that stores contents of each instance of the secret message; scanning, by the server, the target system for the instance of the secret message embedded on the target system; in response to locating the instance of the secret message on the target system, comparing contents of the instance of the secrete message with information stored on the database; and in response to determining that the contents of the instance of the secrete message do not match the information stored on the database, generating an alert.

20 Claims, 4 Drawing Sheets

(56) References Cited

OTHER PUBLICATIONS

What is Steganography, Author Ben Dickson—Published Feb. 6, 2020 (Year: 2020).*

Dey et al., "A Novel Approach of Color Image Hiding using RGB Color planes and DWT," International Journal of Computer Applications, Dec. 2011, 36(5):19-24, 6 pages.

Hamid et al., "Image Steganography Techniques: An Overview," International Journal of Computer Science and Security (IJCSS), 2012, 6(3):168-187, 20 pages.

Joseph, "Image Processing Techniques and Its Applications: An Overview," IJARIIE-ISSN(O)-2395-4396, 2018, 4(3):2168-2174, 7 pages.

Sumathi et al., "A Study of Various Steganographic Techniques Used for Information Hiding," International Journal of Computer Science & Engineering Survey (IJCSES), Dec. 2013, 4(6):9-25, 17 pages.

* cited by examiner

METHOD AND SYSTEM FOR DETECTING UNAUTHORIZED CHANGES AND ACTIVITIES IN A CORPORATE NETWORK USING STEGANOGRAPHY

TECHNICAL FIELD

This disclosure generally relates to information security on an enterprise network.

BACKGROUND

Information security in such environments as an enterprise network is crucial to safeguard sensitive data, protect against cyber threats, and ensure the smooth daily operation of the corporation. One of the biggest challenges in information security is detecting and responding to unauthorized changes and activities on systems within the enterprise network. Such changes and activities can include unauthorized modifications to system configurations, the installation of malware or the exfiltration of sensitive data.

SUMMARY

In one aspect, some implementations provide a computer-implemented method comprising: continuously generating, by a server on an enterprise network, an instance of a secret message encrypting information specific to a target system on the enterprise network; embedding, by the server and using steganography, the instance of the secret message on the target system, wherein the embedding is conducted when the instance of the secret message is generated; maintaining, by the server, a database that is separate from the target system, wherein the database is configured to store contents of each instance of the secret message; scanning, by the server, the target system for the instance of the secret message embedded on the target system; in response to locating the instance of the secret message on the target system, comparing contents of the instance of the secrete message with information stored on the database; and in response to determining that the contents of the instance of the secrete message do not match the information stored on the database, generating an alert.

Implementations may include one or more of the following features.

Generating an alert may include at least one of: alerting a system administrator of an incident; or logging the incident. The method may further include: continuing with embedding an additional instance of the secret message, and scanning the target system for the additional instance of the secret message. Each instance of the secret message may be generated using a hash based on a configuration on the target system. The configuration on the target system may include: one or more files on the target system, a listing of one or more files on the target system, a status of one or more security-related services on the target system, a network address of the target system, or a version of an operating system on the target system. The method may include: generating a new hash based on the configuration on the target system after the instance of the secret message has been embedded; and subsequently comparing the new hash with contents of the instance of the secrete message. Each instance of the secret message may be generated further using randomized data based on: a clock reading, or a temperature measurement. The embedding may include: distributing, by the server, a file to the target system as routinely performed on the enterprise network. The scanning may be performed periodically. The scanning may be performed daily, weekly, bi-weekly, or monthly.

In another aspect, the implementations provide a computer system comprising one or more computer processors configured to perform operations of: continuously generating an instance of a secret message encrypting information specific to a target system on the enterprise network; embedding, using steganography, the instance of the secret message on the target system, wherein the embedding is conducted when the instance of the secret message is generated; maintaining a database that is separate from the target system, wherein the database is configured to store contents of each instance of the secret message; scanning, by the server, the target system for the instance of the secret message embedded on the target system; in response to locating the instance of the secret message on the target system, comparing contents of the instance of the secrete message with information stored on the database; and in response to determining that the contents of the instance of the secrete message do not match the information stored on the database, generating an alert.

Implementations may include one or more of the following features.

Generating an alert may include at least one of: alerting a system administrator of an incident; or logging the incident. The method may further include: continuing with embedding an additional instance of the secret message, and scanning the target system for the additional instance of the secret message. Each instance of the secret message may be generated using a hash based on a configuration on the target system. The configuration on the target system may include: one or more files on the target system, a listing of one or more files on the target system, a status of one or more security-related services on the target system, a network address of the target system, or a version of an operating system on the target system. The method may include: generating a new hash based on the configuration on the target system after the instance of the secret message has been embedded; and subsequently comparing the new hash with contents of the instance of the secrete message. Each instance of the secret message may be generated further using randomized data based on: a clock reading, or a temperature measurement. The embedding may include: distributing, by the server, a file to the target system as routinely performed on the enterprise network. The scanning may be performed periodically. The scanning may be performed daily, weekly, bi-weekly, or monthly.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The subject matter described in this specification can be implemented to realize one or more of the following advantages. First, the implementations are tied to the operation of a computer and a network (e.g., a server on an enterprise network) where the operations cannot practically be performed in the human mind. For example, the implementations entail continuous encryption of hash values of computer specific information such as file system information.

Additionally, the implementations involve file distribution and scanning on a regular and routine basis, e.g., as performed by a CRON job on a UNIX system. None of these can practically be performed in the human mind. Second, the implementations provide a practical application of continuously generating and embedding secret messages, which can be specific to a target system on an enterprise system, and periodically scanning the target system to verify system integrity and detect unauthorized access. As explained in more detail below, the practicable application can be provided as an add-on module to a general monitoring software. The added capability of automatically and dynamically detecting unauthorized access to files, changes made to the files, as well as malicious or abnormal network activities by comparing the embedded secret message and the system data. The capability adds significantly more to the general monitoring software by integrating with existing security systems on a corporate network.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

The disclosed technology aims to establish a covert channel to detect unauthorized changes and activities on an enterprise system by using the technique of steganography, which allows for the embedding of a "secret" message or code within an innocuous file distributed to all systems on the corporate network. The implementations can use this message or code to identify the specific system on which it resides. The message or code can include information about the system's current configuration and status. By continuously embedding the message or code into files on the system, the implementations can detect unauthorized access to the files by periodically scanning the system on the enterprise network for the presence of this message or code, and comparing it to a known "good" version to detect any discrepancies. Significantly, the implementations can continue to update this file on the system with the latest configurations and system information. In other words, the embedding is not a one-time operation. For example, the file is updated whenever there is a legitimate and approved system change. Details of the implementations are provided below, in association with FIGS. 1-3.

Figure 1:
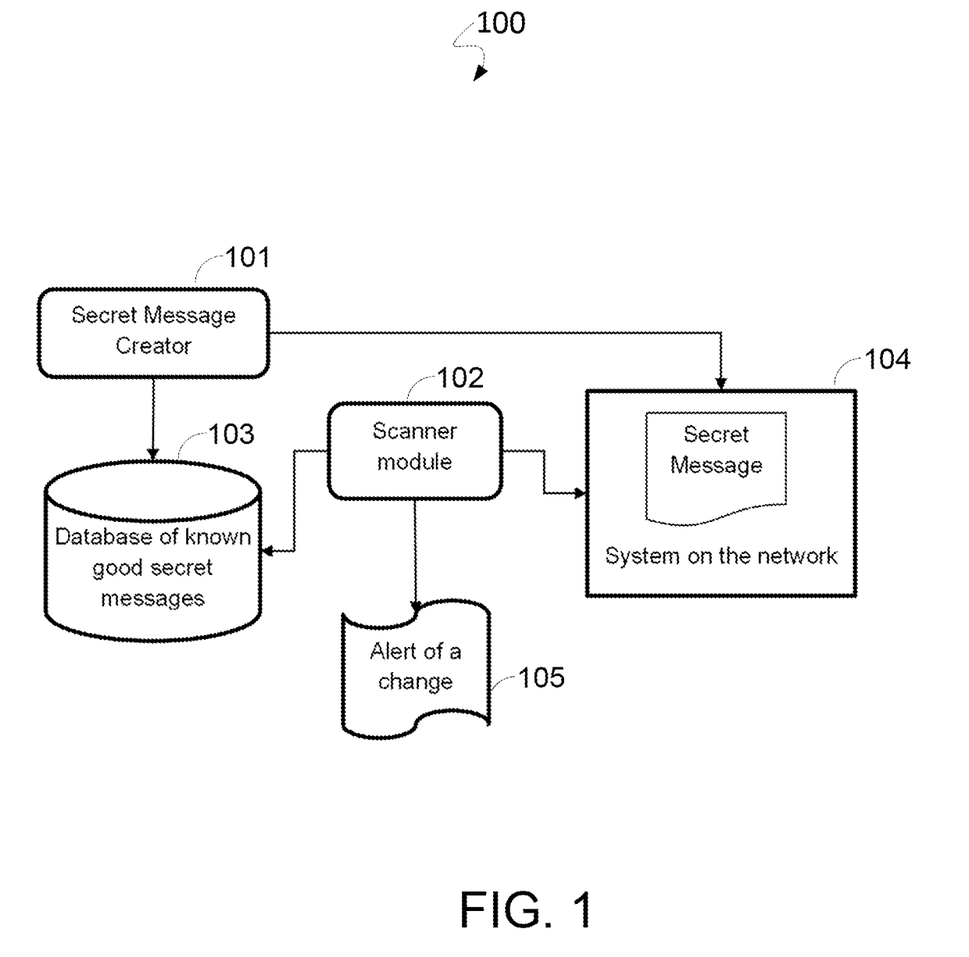
FIG. 1 illustrates an example of a system diagram for enhanced vibration monitoring according to some implementations of the present disclosure.

FIG. 1 illustrates an example of a system diagram 100 according to some implementations of the present disclosure. As illustrated, the implementations can include a secret message creator 101, scanner module 102, and database 103 to work in tandem for monitoring a system (104) on the enterprise network.

In more detail, secret message creator 101 can generate a secret message at a given time. The secret message may also be referred to as a secret code. The implementations may embed the secret message the "secret" message or code within a seemingly harmless file, such as a company logo, that is distributed to all systems on the enterprise network including, for example, system 104. Significantly, the implementations seek to continuously embed the message or code into the system files and data regularly. In the meantime, the implementations also perform periodic scanning of system 103 on the network for the presence of the "secret" message or code, and comparing it to a known "good" version, e.g., maintained at database 103, to check for discrepancies. In the event, a system (e.g., system 104 on the enterprise network) is found to have an outdated or modified version of the message or code, the system is flagged as having an unauthorized change in its security configuration and an alert 105 is raised. Using a coordinated framework of continuously embedding a varying secret message decipherable only to the sender and/or intended recipient(s), periodically scanning systems on the enterprise network, the implementations can track system activities and usage, thereby allowing the organization to detect unauthorized access to files, detect changes made to the files, as well as detect malicious or abnormal network activities by comparing the embedded data and the system data in accordance with the disclosed technology.

As used herein, "secret message" refers to a message that is hidden or encrypted in such a way that only the intended recipient can read the secret message. A secret message can be used for various purposes, such as authentication, confidentiality, or non-repudiation. For example, a secret message can be embedded in an image using steganography, or encrypted with a key using cryptography. A secret message can be any type of data, such as text, audio, video, or binary.

In comparison, "hash value" refers to a fixed-length string of characters that is derived from another block of data using a mathematical function called a hash function. A hash value can be used to verify the integrity of data, which means that the data has not been altered or corrupted. For example, a hash value can be calculated for a file or a message using a checksum algorithm, such as MD5 or SHA-1. A hash value can also be used for other purposes, such as indexing, fingerprinting, or digital signatures. A hash value is usually much smaller than the original data, and it is designed to be unique and irreversible. Here, a checksum is a type of hash value that is calculated for a file or a message to ensure that the underlying data has not been modified or corrupted during transmission or storage. A checksum can be compared with another checksum that is provided by the source or the sender of the file or the message. If the checksums match, then the file or the message is assumed to be intact and authentic. If the checksums do not match, then the file or the message is assumed to be tampered with or damaged.

The difference between a secret message and a hash value is that a secret message can be recovered or decrypted by the intended recipient, while a hash value cannot be reversed or inverted to obtain the original data. A secret message can be utilized to protect the data from unauthorized access or disclosure, while a hash value is used to detect any changes or errors in the underlying data. A secret message requires a key or a password to encode or decode the secret message, while a hash value does not require any key or password to generate or verify the hash value.

In contrast to various other approaches using steganography (e.g., hiding information within other seemingly innocent data or media in a way that the presence of the hidden information is not easily detectable by would be perpetrators) so that data exfiltration at an enterprise network can be detected, the implementations seek to generate secret message on an on-going basis so that otherwise innocuous files on the system can be embedded with an evolving secure message, and when scanned periodically, the secret message embedded in the files can be decoded and then compared with the current master version for consistency. For example, the periodic scan can be implemented using a CRON job on a UNIX system. In the event of inconsistency (e.g., staleness, or alteration), the implementations may generate an alert to flag potential incidence of compromise. Accordingly, the implementations can detect unauthorized changes and activities in a corporate network using a steganography approach via a covert channel to continuously embed a secret message decipherable only by the intended recipient (e.g., using the public key of the intended recipient). The implementations can thus provide a robust and stealthy approach to identifying and mitigating unauthorized changes and activities on systems within a corporate network.

Indeed, the implementations can use the information from the steganography channel in combination with other methods such as File Integrity Monitoring (FIM), Configuration Management and Host-Based Intrusion Detection System (HIDS) to achieve comprehensive protection against unauthorized access and activities.

For example, FIM involves monitoring and verifying the integrity of files and directories on a system to detect unauthorized changes to files, which could be indicative of malicious activity or software vulnerabilities. FIM may initially establish a baseline by calculating cryptographic hashes (such as SHA-256) of files on a system. These hashes represent the "normal" state of the files. FIM may then periodically calculate new hashes for the files and compare the hashes with the baseline hashes. The differences indicate changes to the files. If unauthorized changes are detected, FIM can trigger alerts to administrators or log the event for further investigation.

Configuration management involves maintaining consistent and secure configurations for systems and devices across an enterprise network to help prevent security vulnerabilities that could arise from misconfigurations. For example, configuration management standardize system setup according to security best practices and organizational policies. Under configuration management protocols, changes to configurations are controlled and documented, thereby reducing the risk of accidental misconfigurations. Configuration management protocols also allow for consistent and automated deployment of security patches and updates.

Host-Based Intrusion Detection System (HIDS) is a security solution that monitors the activities and events on individual hosts (e.g., computers or servers). It identifies and alerts administrators to potential security breaches or suspicious behavior at the host level. HIDS monitors various host activities, such as file access, logins, system calls, and network traffic. HIDS compares observed behavior to pre-defined patterns of normal behavior. Deviations from these patterns can trigger alerts. For example, when suspicious activities are detected, HIDS generates real-time alerts to administrators, allowing for rapid response to potential threats. HIDS logs can be valuable for post-incident analysis to understand the scope and impact of security incidents.

The implementations of the present disclosure can combines steganography techniques with these methods (e.g., FIM, HIDS, and configuration management) to provide a more robust and stealthy approach for detecting unauthorized changes and activities in a corporate network. By continuously embedding the message or code into the system files and data regularly, the implementations allow an enterprise to detect unauthorized access to files, detect changes made to the files, as well as detect any malicious or abnormal network activities by comparing the embedded data and the system data.

In various implementations, the specific attributes of a secret message included in the "secret" message or code will depend on the specific security threats to detect. That said, the secret message according to the implementations can generally include the following.

Unique system identifier: a unique identifier for the system, such as the system's IP address or hostname, that can be used to identify the specific system the message or code is running on.

Timestamp: a timestamp that indicates when the message or code was last updated, which can be used to track changes to the system over time and detect unauthorized modifications to its configuration.

System configuration information: information about the current configuration of the system, such as the version of the operating system, the list of installed software, and the status of security-related services and settings.

Randomized or encoded data: a random value or an encoded data that can be used as an additional layer of protection. Examples can include a temperature reading at the time (e.g., ambient temperature or processor temperature), or a string derived from the system clock at the time (e.g., a time zone specific reading).

Hash values: Hash values of the system's files and data, for file integrity monitoring.

Figure 2A:
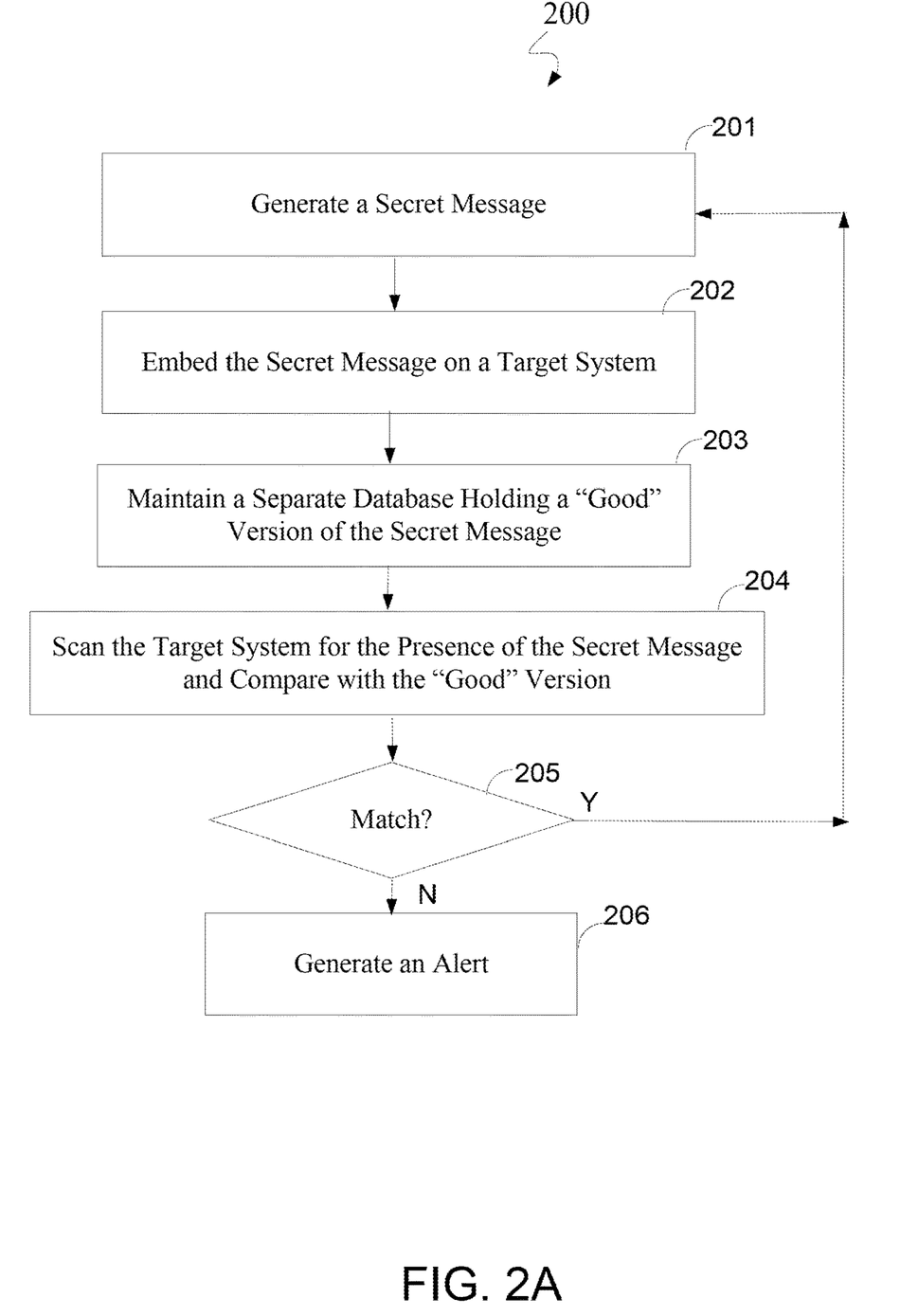
FIGS. 2A-2B illustrate examples of flow charts according to some implementations of the present disclosure.

FIG. 2A illustrates an example of a flow chart 200 in accordance with some implementations of the present disclosure. The implementations may generate a secret message (201), for example, using secret message creator 101. The secret message can be derived from system-level information and data. In one example, the secret message can be based on information specific to the target system such as cryptographic hashes (such as SHA-256) of a file system (or a collection of files) on the target system. In other examples, the secret message can be based on information less specific such as a time stamp on the target system, a version of the operating system installed on the target system, the list of installed software on the target system, the on/off status of security-related services on the target system. Due to standardized configuration within an enterprise network, these examples can be less specific than a hash of the file system of the target system. Additional examples can include the IP address of the target system, or system identifier. Significantly, in these examples, the secret message is encrypted. For example, the secret message can be encrypted by the recipient's public key so that only the recipient can decode and review the contents.

The implementations may then embed the secret message on the target (202). For example, the embedding can be performed through a covert channel so that the secret message or code becomes embedded within a seemingly harmless file that is distributed to all systems on the enterprise network. Examples of such an innocuous file include company logo or other standard files. In some cases, the embedding is performed to generate a watermark. In contrast to conventional watermark that is not encrypted, the implementations operate using encrypted message, the contents of which are not accessible without the decrypting keys. Moreover, the innocuous file can be distributed within the enterprise network as part of regular and routine maintenance without the appearance of monitoring network security. Significantly, the creation and the embedding of secret messages are occurring continuously, rather than a one-time deal.

The implementations may maintain a separate database holding a "good" version of the secret message (203). For example, the implementations can establish a database that is separate from the target systems but remain accessible to queries. The database can hold the ground truth for the current secret message (e.g., the current file system's hash, the current listing of software installed, the current IP address).

The implementations may scan the target system for the presence of the secret message and compare the discovered secret message with the "good" version on the database (204). For example, on a periodic basis, the implementations may have the server look up the file system on the target system. In some cases, the target system may be prompted to locate the file carrying the secret message, and decrypt the secret message to obtain the payload information. In these cases, the target system may compare the decrypted message with information on the separate database. In other cases, the server may locate, on the target system, the file carrying the secret message, and decrypt the secret message to obtain the payload information. In these cases, the server may compare the decrypted message with information on the separate database.

In response to determining that the decrypted secrete message does not match the contents stored on the separate database (205), the implementations may generate an alert (206). For example, the implementations may message the system administrator to flag the detection of potential unauthorized access or change to the file system, as well as detect any malicious or abnormal network activities. The implementations may also log the detected event and continue the continuous creation and embedding of secret messages that are time-evolving. In response to determining that the decrypted secrete message matches the contents stored on the separate database (205), the implementations may continue the continuous creation and embedding of secret messages that are time-evolving.

Figure 2B:
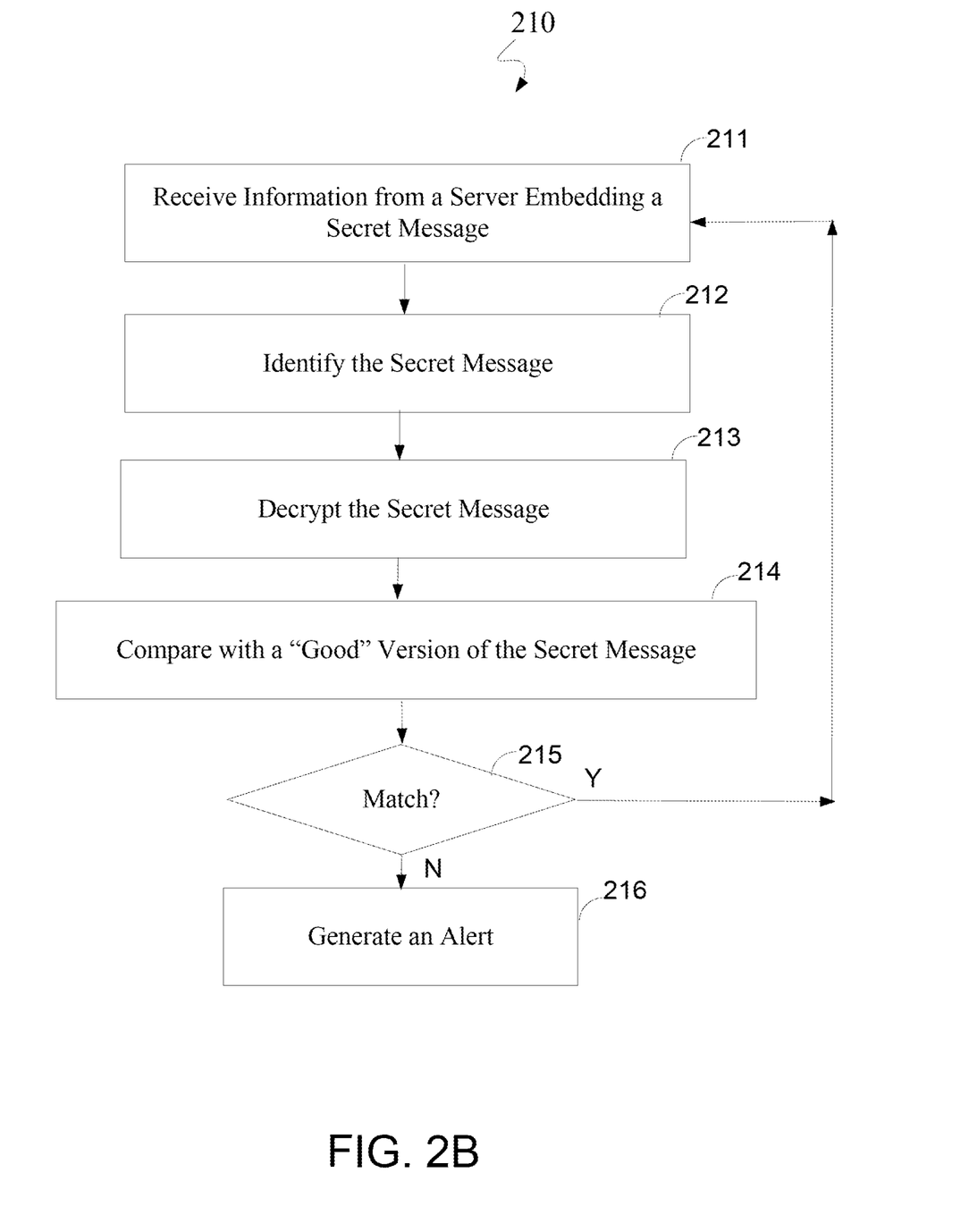

FIG. 2B illustrates another example of a flow chart 210 in accordance with some implementations of the present disclosure. On a target system of the enterprise network, the implementations may receive information from a server embedding a secret message (211). As explained above, the secret message is created and embedded on a continuous basis so that, for example, an innocuous file is distributed to the target system as part of the regular/routine maintenance and without the appearance of security monitoring. On the target system, the implementations may identify the secret message (212), for example, from the innocuous file distributed from the server routinely. On the target system, the implementations may decrypt the secret message (213), for example, using the private key of the target system. On the target system, the implementations may compare the decrypted message with a "good" version of the secret message stored on a separate database (214). As explained above, the separate database stores the ground truth for the payload of each secret message that is time-evolving. In response to determining that the decrypted secrete message does not match the contents stored on the separate database (215), on the target system, the implementations may generate an alert (216), for example, in the form of an alert to the system administrator or a log event in a log file (while the implementations may resume continued receiving, identify, and comparing of decrypted messages). In response to determining that the decrypted secrete message matches the contents stored on the separate database (215), the implementations may continue the operations of continuously receiving subsequently created and embedded secret messages from the server.

Figure 3:
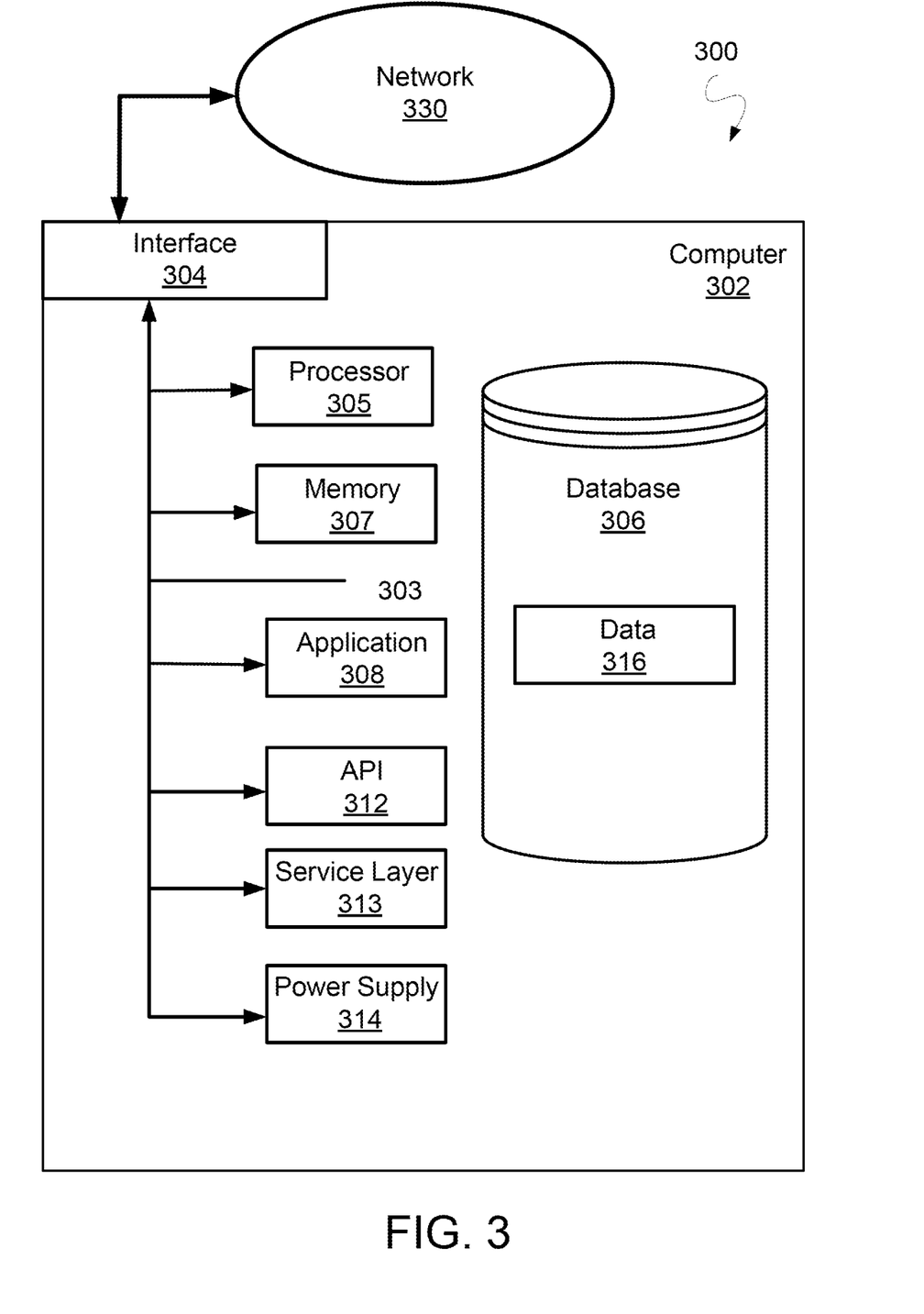
FIG. 3 is a block diagram illustrating an example of a computer system used to provide computational functionalities associated with described algorithms, methods, functions, processes, flows, and procedures, according to some implementations of the present disclosure.

FIG. 3 is a block diagram 300 illustrating an example of a computer system 300 used to provide computational functionalities associated with described algorithms, methods, functions, processes, flows, and procedures, according to some implementations of the present disclosure. The illustrated computer 302 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 302 can comprise a computing device that includes an input device, such as a keypad, keyboard, touch screen, another input device, or a combination of input devices that can accept user information, and an output device that conveys information associated with the operation of the computer 302, including digital data, visual, audio, another type of information, or a combination of types of information, on a graphical-type user interface (UI) (or GUI) or other UI.

The computer 302 can serve in a role in a computer system as a client, network component, a server, a database or another persistency, another role, or a combination of roles for performing the subject matter described in the present disclosure. The illustrated computer 302 is communicably coupled with a network 330. In some implementations, one or more components of the computer 302 can be configured to operate within an environment, including cloud-computing-based, local, global, another environment, or a combination of environments.

The computer 302 is an electronic computing device operable to receive, transmit, process, store, or manage data and information associated with the described subject matter. According to some implementations, the computer 302 can also include or be communicably coupled with a server, including an application server, e-mail server, web server, caching server, streaming data server, another server, or a combination of servers.

The computer 302 can receive requests over network 330 (for example, from a client software application executing on another computer 302) and respond to the received requests by processing the received requests using a software application or a combination of software applications. In addition, requests can also be sent to the computer 302 from internal users, external or third-parties, or other entities, individuals, systems, or computers.

Each of the components of the computer 302 can communicate using a system bus 303. In some implementations, any or all of the components of the computer 302, including hardware, software, or a combination of hardware and software, can interface over the system bus 303 using an application programming interface (API) 312, a service layer 313, or a combination of the API 312 and service layer 313. The API 312 can include specifications for routines, data structures, and object classes. The API 312 can be either computer-language independent or dependent and refer to a complete interface, a single function, or even a set of APIs. The service layer 313 provides software services to the computer 302 or other components (whether illustrated or not) that are communicably coupled to the computer 302. The functionality of the computer 302 can be accessible for all service consumers using this service layer. Software services, such as those provided by the service layer 313, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 302, alternative implementations can illustrate the API 312 or the service layer 313 as stand-alone components in relation to other components of the computer 302 or other components (whether illustrated or not) that are communicably coupled to the computer 302. Moreover, any or all parts of the API 312 or the service layer 313 can be implemented as a child or a sub-module of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302. The interface 304 is used by the computer 302 for communicating with another computing system (whether illustrated or not) that is communicatively linked to the network 330 in a distributed environment. Generally, the interface 304 is operable to communicate with the network 330 and comprises logic encoded in software, hardware, or a combination of software and hardware. More specifically, the interface 304 can comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors can be used according to particular needs, desires, or particular implementations of the computer 302. Generally, the processor 305 executes instructions and manipulates data to perform the operations of the computer 302 and any algorithms, methods, functions, processes, flows, and procedures as described in the present disclosure.

The computer 302 also includes a database 306 that can hold data 316 for the computer 302, another component communicatively linked to the network 330 (whether illustrated or not), or a combination of the computer 302 and another component. For example, database 306 can be an in-memory, conventional, or another type of database storing data 316 consistent with the present disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases of similar or differing types can be used according to particular needs, desires, or particular implementations of the computer 302 and the described functionality. While database 306 is illustrated as an integral component of the computer 302, in alternative implementations, database 306 can be external to the computer 302. As illustrated, the database 306 holds data 316 including, for example, payload of each secret message for a given target system on the enterprise network, as explained in association with FIGS. 1-2.

The computer 302 also includes a memory 307 that can hold data for the computer 302, another component or components communicatively linked to the network 330 (whether illustrated or not), or a combination of the computer 302 and another component. Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 or similar or differing types can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in the present disclosure. For example, application 308 can serve as one or more components, modules, or applications. Further, although illustrated as a single application 308, the application 308 can be implemented as multiple applications 308 on the computer 302. In addition, although illustrated as integral to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion or management circuits (including recharging, standby, or another power management functionality). In some implementations, the power-supply 314 can include a power plug to allow the computer 302 to be plugged into a wall socket or another power source to, for example, power the computer 302 or recharge a rechargeable battery.

There can be any number of computers 302 associated with, or external to, a computer system containing computer 302, each computer 302 communicating over network 330. Further, the term "client," "user," or other appropriate terminology can be used interchangeably, as appropriate, without departing from the scope of the present disclosure. Moreover, the present disclosure contemplates that many users can use one computer 302, or that one user can use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/- R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperable coupled with a hardware processor configured to perform the computer-implemented method or the instructions stored on the non-transitory, computer-readable medium.

What is claimed is:

1. A computer-implemented method comprising:
   continuously generating, by a server on an enterprise network, an instance of an encrypted secret message comprising system configuration information specific to a target system on the enterprise network;
   embedding, by the server and using steganography, the instance of the encrypted secret message into a digital file and transmitting the digital file to the target system, wherein the embedding is conducted when the instance of the encrypted secret message is generated;
   maintaining, by the server, a database that is separate from the target system, wherein the database is configured to store contents of each instance of the encrypted secret message;
   scanning, by the server, the target system for the instance of the encrypted secret message embedded in the digital file on the target system;

in response to locating the instance of the encrypted secret message on the target system, decrypting the instance of the encrypted secret message and comparing contents of the decrypted instance of the encrypted secret message with information stored on the database; and in response to determining that the contents of the decrypted instance of the encrypted secret message do not match the information stored on the database, generating an alert.

2. The computer-implemented method of claim 1, wherein generating the alert comprises at least one of:
    alerting a system administrator of an incident; or
    logging the incident.

3. The computer-implemented method of claim 1, further comprising:
    continuing with embedding an additional instance of the encrypted secret message, and
    scanning the target system for the additional instance of the encrypted secret message.

4. The computer-implemented method of claim 1, wherein each instance of the encrypted secret message is generated using a hash based on the system configuration information of the target system.

5. The computer-implemented method of claim 4, wherein the system configuration information of the target system comprises: one or more files on the target system, a listing of one or more files on the target system, a status of one or more security-related services on the target system, a network address of the target system, or a version of an operating system on the target system.

6. The computer-implemented method of claim 4, further comprising:
    generating a new hash based on the system configuration information of the target system after the instance of the encrypted secret message has been embedded; and
    subsequently comparing the new hash with contents of the instance of the encrypted secret message.

7. The computer-implemented method of claim 4, wherein each instance of the encrypted secret message is generated further using randomized data based on: a clock reading, or a temperature measurement.

8. The computer-implemented method of claim 1, wherein the embedding comprises:
    distributing, by the server, the digital file to the target system as routinely performed on the enterprise network.

9. The computer-implemented method of claim 1, wherein the scanning is performed periodically.

10. The computer-implemented method of claim 9, wherein the scanning is performed daily, weekly, bi-weekly, or monthly.

11. A computer system comprising one or more computer processors configured to perform operations of:
    continuously generating an instance of an encrypted secret message comprising system configuration information specific to a target system on an enterprise network;
    embedding, using steganography, the instance of the encrypted secret message into a digital file and transmitting the digital file to on the target system, wherein the embedding is conducted when the instance of the encrypted secret message is generated;
    maintaining a database that is separate from the target system, wherein the database is configured to store contents of each instance of the encrypted secret message;
    scanning the target system for the instance of the encrypted secret message embedded in the digital file on the target system;
    in response to locating the instance of the encrypted secret message on the target system, decrypting the instance of the encrypted secret message and comparing contents of the decrypted instance of the encrypted secret message with information stored on the database; and
    in response to determining that the contents of the decrypted instance of the encrypted secret message do not match the information stored on the database, generating an alert.

12. The computer system of claim 11, wherein generating the alert comprises at least one of:
    alerting a system administrator of an incident; or
    logging the incident.

13. The computer system of claim 11, wherein the operations further comprise:
    continuing with embedding an additional instance of the encrypted secret message, and
    scanning the target system for the additional instance of the encrypted secret message.

14. The computer system of claim 11, wherein each instance of the encrypted secret message is generated using a hash based on the system configuration information of the target system.

15. The computer system of claim 14, wherein the system configuration information of the target system comprises: one or more files on the target system, a listing of one or more files on the target system, a status of one or more security-related services on the target system, a network address of the target system, or a version of an operating system on the target system.

16. The computer system of claim 14, wherein the operations further comprise:
    generating a new hash based on the system configuration information of the target system after the instance of the encrypted secret message has been embedded; and
    subsequently comparing the new hash with contents of the instance of the encrypted secret message.

17. The computer system of claim 14, wherein each instance of the encrypted secret message is generated further using randomized data based on: a clock reading, or a temperature measurement.

18. The computer system of claim 11, wherein the embedding comprises:
    distributing the digital file to the target system as routinely performed on the enterprise network.

19. The computer system of claim 11, wherein the scanning is performed periodically.

20. The computer system of claim 19, wherein the scanning is performed daily, weekly, bi-weekly, or monthly.

* * * * *